Patented Aug. 19, 1952

2,607,689

UNITED STATES PATENT OFFICE 2,607,689

PROCESS OF TREATING COFFEE

William J. Hale, Midland, Mich., assignor to Verdurin Company, Detroit, Mich., a corporation of Michigan No Drawing. Application July 11, 1949, Serial No. 104,139

15 Claims. (Cl. 99—65)

This invention relates to a process of treating coffee and to a roasted coffee product of improved quality.

Broadly considered, the invention comprehends the concept of roasting coffee in the presence of or in contact with a non-toxic porphyrin type compound which has a selective, beneficial action on certain undesirable constituents of the coffee bean to thereby produce a product of enhanced quality.

In the plant world the catalyst chlorophyll exists in two well defined forms, chlorophyll-a ($C_{55}H_{72}O_5N_4Mg$) and chlorophyll-b $$(C_{55}H_{70}O_6N_4Mg)$$

in the ratio of about 3 to 1 respectively. The former readily undergoes oxidation into the latter in the presence of air and the latter readily undergoes reduction into the former through the agency of carotenes and similar deoxidants always present wherever chlorophyll is present. In the presence of sunlight the coordinated function of chlorophylls and carotenes suffices to reduce carbonic acid of the atmosphere into the vast array of organic compounds on earth.

The interplay of oxidative and reductive agencies within the leaves and parts of growing plant continues through the life of plant except for periods of dormancy among the deciduous. Following dormancy a new rebirth of chlorophyll within the budding leaves reinvigorates the oxidative-reductive cycle. Naturally the fruits of many plants carry their specific share of these catalysts, but in the ripening of fruit much, if not all, of the chlorophyll is destroyed, witness, for example, the green apple ripening into red.

In much the same manner the green berry, in ripening, is observed to undergo a change in color toward the yellow, brown and red. It is further to be noted that certain fruits of their own, and in green status, are able by merely standing in presence of air, to undergo oxidation to the point of ripening; witness, for example, the green banana transformed into the yellow ripe and mellow fruit. The chlorophyll in the banana, in both flesh and skin, has served as catalyst for the oxidation of various cellulosic and hemicellulosic material into edible starches and sugars.

Of particular note is the presence of a trace of chlorophyll in the green coffee bean. Though the bean will ripen when left to itself, it has the property of developing a most pleasant aroma when roasted before the green berry has turned brown, and to such extent that a beverage made from the roasted bean is highly palatable. Of course, the quantity of chlorophyll in the roasted coffee bean is practically nil. No chlorophyll could withstand 400° F. roasting. But in the green bean there is present usually about $\frac{1}{500}$ of 1% of chlorophyll. Undoubtedly even this exceedingly small content of chlorophyll will play its role as oxidative catalyst increasingly with rise in temperature, or up to point of its decomposition. On this basis it has now been determined that chlorophyll may play a beneficial role in destroying small portions of chlorogenic acid and trigonelline, two of the undesirable factors always present in coffee. At the same time chlorophyll appears to be incapable of destroying the caffeine content of coffee. These facts, as will be appreciated, make possible the producing of an improved beverage.

As is known to those skilled in the art, the degree and duration of roasting coffee beans have much to do with final composition of roasted bean. Where over-roasting is carried on there is found to be present somewhat less trigonelline under the normal content of approximately 1 per cent. of same in ordinary roasted coffee. So, likewise, the content of chlorogenic acid in highly roasted coffee is no more than 75% of the usual 4 to 5 per cent. of same in ordinary roasted coffee. In all cases the caffeine content of about 1 per cent. by weight remains constant for lightly roasted or highly roasted coffee so long as there has occurred no burning that leads to its destruction.

There have been many attempts to improve the beverage qualities of coffee extract and at the same time to remove certain of the undesirable components. Most well-known here is Sanka, from a coffee bean that has suffered the loss of the greater portion of its caffeine through extraction with trichloroethylene or other solvents. As caffeine is a heart stimulant, the newly produced Sanka can scarcely incite sleeplessness. But the deleterious component of coffee is not caffeine; it is the alkaloid trigonelline, and anhydride of the toxic No-methyl-hydroxy-nicotinic acid. So, likewise, chlorogenic acid through its hydrolytic products, caffeic and quinic acids, is more than likely to set up points of intestinal irritation.

It is now found that the impregnation of green coffee beans with an additional quantity of chlorophyll amply suffices for a more extensive catalytic oxidation of the contents of the bean without materially affecting the content of the caffeine, so desirable as stimulating factor in coffee beverages. In particular we note that the deleterious trigonelline and chlorogenic acid are markedly reduced in percentage content. Furthermore, as may well have been inferred, the additional oxygenative action serves well to couple butyl, furfuryl and other mercaptans into the polysulphide stage—or that stage definitely contributive to coffee aroma. So marked is this that if sufficient chlorophyll can be evenly distributed within the green bean the oxidative processes accompanying roasting can be carried out in shorter time and often times at lower temperatures; all of which makes possible a less toxic coffee beverage and yet one with an enhanced aroma. Naturally, too long a roasting with or without chlorophyll will destroy all aroma; hence 5 to 10 minutes roasting is the general practice.

The term chlorophyll, as herein employed, comprehends a class of non-toxic compounds comprising a structure of four pyrrole rings (through their alpha carbon atoms) and four methine groups linked alternately into a 16-membered carbon-nitrogen ring known as porphin, wherein derivatives of such, known as porphyrins, comprising the naturally occurring haeme and chlorophyll, are primarily concerned in this study. The haeme derivatives carry a metallo-complex of iron; whereas the chlorophyll derivatives carry a metallo-complex of magnesium. Furthermore, many of these compounds, as haeme and ordinary chlorophyll, are insoluble in water. In the purview of this invention, preferably soluble or solubilized forms of these porphyrin compounds are employed. This, by reason of the fact that as deep a penetration of the green bean must be effectuated if we would attain the highest degree of reaction within the bean upon roasting.

The union of haeme with the protein globin leads to the soluble haemoglobin. But of most striking note this globin confers upon the haeme molecule the property of reacting reversibly with oxygen without suffering a change in valence of its ferrous iron-complex into the ferric state as present in haematin. In general haeme and haematin derivatives possess a peroxidase activity. The enzyme peroxidase occurs in many plants and serves ideally in an oxidative capacity wherever such plants are subject to chemical changes, as for example, in the roasting of coffee beans.

In the case of chlorophyll there is readily securable a water-soluble form simply by hydrolyzing away the phytyl group to yield a type of compound known as a chlorophyllide; a little further hydrolysis eliminates the methyl group attached to the remaining carbomethoxyl such that the end-product is no longer an ester but a free acid usually in the form of an alkali salt; this product is known as a chlorophyllin. Both chlorophylide and chlorophyllin are equally as reactive toward oxygen as is the insoluble chlorophyll. Indeed the magnesium-complex of all of these compounds can also be removed by acid treatment whereupon the resulting pheophorbins and pheophytins respectively come to hand. They too are equally as reactive toward oxygen as is chlorophyll.

Basically this invention comprehends only the employment of such porphyrins as are capable of taking up and giving off oxygen to the surrounding media, notably here the coffee bean itself; and primarily this invention comprehends the diffusion throughout the to-be-roasted product of considerably more of these oxidative agents than are normally to be found in said bean or product to be roasted, that is not less than $1/500$ of 1 per cent.

In a recent patent to Sidney Musher, U. S. P. 2,198,207 of April 23, 1940 (see also earlier U. S. P. 2,026,697 of January 7, 1936), there is presented a means for stabilizing roasted coffee simply by spraying hot coffee beans, toward the end of roasting process, with powdered green coffee in aqueous dispersion or suspension, and even with extract of the green beans. Of course, this treatment introduces the normal proportion of undesirables, chlorogenic acid and trigonelline, and cannot function in any such capacity as is required in the present invention. It is well known that chlorophyll does not yield readily to extraction from green vegetable matter by alcohol and water; much less, then, can we expect a coffee bean of practically no chlorophyll content to yield up any chlorophyll whatsoever. Thus the overall content of caffeine, chlorogenic acid and trigonelline in the resulting beverage from above-cited patent cannot differ from that generally found in roasted coffee; the advantage claimed rests entirely on attainment of greater stability against oxidation.

With the purview of the present invention there is no concern for stabilization. The sole purpose here is to raise the oxidizing power to a point guaranteeing the reduction of chlorogenic acid and trigonelline as present throughout the bean. The addition of green coffee or its total extracts to roasted coffee is the equivalent of roasting coffee by successive stages. The present invention proposes to carry the oxidant chlorophyll into the innermost interstices of the green bean so as to effect as complete an oxidation as possible in the subsequent roasting. Hereby the undesirable components that are readily oxidizable will be destroyed. Though numerous oxidants have been tried the best by far comprise the porphyrins, totally non-toxic and readily destroyed in the process itself. On the other hand an application of chlorophyll and other porphyrins to the "roasted" bean is found to contribute to a disturbance in balance between the polysulphides supplying the coffee aroma, and increases possibility to staleness in resulting beverage.

In carrying out the invention, porphyrin derivatives were introduced into green coffee beans as well also as in roasted coffee beans. Analytical results indicated a considerable decomposition of only the more readily oxidizable components, such as chlorogenic acid (inclusive of its constituent parts, caffeic and quinic acids) and trigonelline, but not appreciatively of caffeine and the polysulphides. The result is the enhancement of the final product for beverages in all cases where the green beans were treated, but in the case of roasted beans only when roasting had been scarcely started.

The coffee bean selected was that of Brazilian type, known as $AP_1$, analyzing in green state for 0.96 per cent. caffeine; 5.60 per cent. chlorogenic acid; and 1.20 per cent. trigonelline.

The eminent utility of the invention will be appreciated from a consideration of the following examples:

*Example 1*

To one pound (450 grams) of green Brazilian coffee bean gently dried to a constant moisture content of 5 to 8 per cent. (from original 15–17%) there was added 50 cc. of an aqueous solution containing 0.2 gram of the porphyrin pheophorbide. This volume of solution is sufficient to wet thoroughly the entire lot of beans.

After standing for a few hours and finally air-dried the beans were roasted in the usual manner for 8 to 10 minutes, then ground. The beverage obtained therefrom in a percolating apparatus displayed an enhanced aroma. By analysis the roasted beans carried 1.00 per cent. caffeine, 3.5 per cent. chlorogenic acid and 0.6 per cent. trigonelline.

*Example 2*

Example 1 was repeated save here an equivalent quantity of haemoglobin (0.3 gram) was substituted for the pheophorbin. The results were practically identical with those of Example 1: caffeine 1 per cent., chlorogenic acid 3.4 per cent., and trigonelline 0.7 per cent.

*Example 3*

Example 1 was repeated save here an equivalent quantity of sodium iron chlorophyllin in green powder of 65% concentration was used (0.3 gram). The green powder was dissolved in 50 cc. of distilled water as in Example 1 and applied to one pound of gently dried green Brazilian coffee beans. After roasting the product analyzed for caffeine 1.02 per cent., chlorogenic acid 3.38 per cent., and trigonelline 0.6 per cent.

*Example 4*

Example 3 was repeated but the dried beans were treated with only half the quantity of sodium iron chlorophyllin dissolved in 25 cc. of water, dried and roasted for 3 minutes. After cooling these semi-roasted beans were treated with another and like portion of sodium iron chlorophyllin in 25 cc. of water, dried and roasted again for 3 minutes. The result indicated greater destruction of the undesirables but aroma of beverage was not so pleasant. Analysis: caffeine .91 per cent., chlorogenic acid 3.1 per cent., and trigonelline 0.44 per cent.

*Example 5*

To one pound of the aforementioned green Brazilian coffee beans dried to 10 per cent. moisture was added 0.7 gram of potassium magnesium chlorophyllin in green powder of 25 per cent. concentration dissolved in 50 cc. distilled water and 5 cc. of ethyl alcohol added thereto to increase wetting action on beans. After roasting for 10 minutes the coffee analyzed for caffeine 0.9 per cent., chlorogenic acid 2.5 per cent., and trigonelline 0.2 per cent.

*Example 6*

Example 5 repeated with the green coffee beans cut into halves to increase penetration. After roasting the coffee analyzed for caffeine 0.9 per cent., chlorogenic acid 1.6 per cent. and trigonelline 0.11 per cent.

*Example 7*

To one pound of decaffeined coffee was added 30 cc. of a water solution of 0.3 gram of sodium iron chlorophyllin (65% conc.). After drying and roasting for 4 minutes, the product analyzed for caffeine 0.80 per cent. (same as original), chlorogenic acid 0.1 per cent. (original=3.5%) and trigonelline 0.1 per cent. (original=0.8%).

In most of these examples the flavor and aroma of the coffee beverage obtained from the finished product is definitely enhanced over the best of coffee beverages generally obtainable. The most desirable end-products result from higher penetration of the green bean by the oxidant solution. The cracked green beans are here to be preferred. The addition of a wetting agent is generally desirable but scarcely so when cracked beans are employed. Ordinary ethyl alcohol was found most satisfactory as wetting agent. Glycols and other non-toxic wetting agents may be used. In all cases the solution of the oxidant should be adjusted to alkalinity slightly above pH 7. On the acid side it is necessary to employ specific solvents to effect satisfactory penetration.

The employment of 0.045 gram of chlorophyllin to 1 pound of green coffee bean is equivalent to $1/100$ of 1 per cent. chlorophyll content in bean to be roasted. This is more than 5 times the quantity of chlorophyll generally present as maximum in green coffee beans. In some instances as much as 2 per cent. of chlorophyll content was employed merely to induce greater penetration of bean by the concentrated solution. When quick roasting is desirable at higher temperatures, the presence of increased chlorophyll is desirable.

Likewise it is found advantageous at times to accept small quantities of the generally accompanying carotenes with the chlorophyll employed. The carotenes aid in the stabilizing of the chlorophyll itself, especially valuable in the initial stage or heating-up of the coffee beans, as well as in promoting the oxidation steps.

It is also possible to employ insoluble chlorophyll itself if such is solubilized by the presence of certain solvents such as alcohol and acetone. Penetration of the green bean is all the more speedy, but a solvent recovery system is here called for.

While a preferred modification of the invention has been described, it is to be understood that this is given to illustrate the underlying principle of the invention and not as limiting the useful scope of the invention to the particular chosen embodiment.

I claim:

1. A method of preparing coffee which comprises impregnating dried green coffee with a solution of non-toxic oxygen-carrying porphyrin and roasting the coffee up to a temperature not substantially in excess of 400° F. for a period of time sufficient to destroy a substantial portion of the chlorogenic acid and trigonelline present in the green coffee.

2. A process in accordance with claim 1 in which the porphyrin is chlorophyllin.

3. A process in accordance with claim 1 in which the porphyrin is a solubilized chlorophyll.

4. A process in accordance with claim 1 in which the porphyrin is a chlorophyllide.

5. A process in accordance with claim 1 in which the porphyrin is pheophorbin.

6. A process in accordance with claim 1 in which the porphyrin is sodium iron chlorophyllin.

7. A process in accordance with claim 1 in which the porphyrin is potassium magnesium chlorophyllin.

8. A method of enhancing the beverage quality of coffee which comprises incorporating within unroasted coffee a solubilized porphyrin and then roasting the coffee.

9. A method of enhancing the beverage quality of coffee which comprises incorporating within unroasted coffee a solubilized, non-toxic, oxygen-carrying porphyrin to no more than approximately 2% by weight of the coffee and then roasting the coffee.

10. A process in accordance with claim 9 in which the porphyrin is a solubilized chlorophyll.

11. A process in accordance with claim 9 in which the porphyrin is a solubilized chlorophyll and its naturally accompanying carotenes.

12. A process in accordance with claim 9 in which the porphyrin is a solubilized pheophytin.

13. A process in accordance with claim 9 in which the porphyrin is a solubilized pheophorbin derivative.

14. A method of enhancing the beverage quality of coffee which comprises roasting coffee in the presence of a non-toxic, oxygen-carrying porphyrin which, at the roasting temperature, oxidizes a portion of the naturally occurring chlorogenic acid and trigonelline without substantially oxidizing the caffeine.

15. A method of reducing the trigonelline content of coffee which comprises roasting the coffee in the presence of a solubilized porphyrin.

WILLIAM J. HALE.

REFERENCES CITED

The following references are of record in the file of this patent:

UNITED STATES PATENTS

| Number | Name | Date |
|---|---|---|
| 1,313,209 | Robison | Aug. 12, 1919 |
| 1,822,227 | Lendrich | Sept. 8, 1931 |
| 1,956,290 | Henser | Apr. 24, 1934 |
| 2,341,723 | Kennedy | Feb. 15, 1944 |